(12) United States Patent
Kim et al.

(10) Patent No.: US 7,098,957 B2
(45) Date of Patent: Aug. 29, 2006

(54) METHOD AND APPARATUS FOR DETECTING REPETITIVE MOTION IN AN INTERLACED VIDEO SEQUENCE APPARATUS FOR PROCESSING INTERLACED VIDEO SIGNALS

(75) Inventors: Yeong-Taeg Kim, Irvine, CA (US); Shin-Haeng Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 662 days.

(21) Appl. No.: 10/002,915

(22) Filed: Oct. 23, 2001

(65) Prior Publication Data

US 2002/0080284 A1    Jun. 27, 2002

Related U.S. Application Data

(60) Provisional application No. 60/273,100, filed on Mar. 2, 2001, provisional application No. 60/257,365, filed on Dec. 20, 2000, provisional application No. 60/257,338, filed on Dec. 20, 2000.

(51) Int. Cl.
*H04N 5/14* (2006.01)
*H04N 7/01* (2006.01)
*H04N 9/64* (2006.01)
*H04N 11/20* (2006.01)

(52) U.S. Cl. ............... 348/452; 348/448; 348/701; 348/441; 382/260; 382/265

(58) Field of Classification Search ........ 348/448, 348/451–452, 699–701, 910, 441, 44; 382/260, 382/265, 300; H04N 7/01, 11/20, 5/14, 9/64

See application file for complete search history.

(56) References Cited

U.S. PATENT DOCUMENTS

| | | | | |
|---|---|---|---|---|
| 5,027,201 A | * | 6/1991 | Bernard | 348/702 |
| 5,434,627 A | * | 7/1995 | Weston | 348/609 |
| 5,532,750 A | * | 7/1996 | De Haan et al. | 348/452 |
| 5,638,139 A | * | 6/1997 | Clatanoff et al. | 348/701 |
| 5,682,205 A | * | 10/1997 | Sezan et al. | 348/452 |
| 5,694,177 A | * | 12/1997 | Flannaghan et al. | 348/607 |
| 5,748,250 A | * | 5/1998 | Markandey et al. | 348/451 |
| 5,903,680 A | * | 5/1999 | De Haan et al. | 382/265 |
| 5,943,099 A | * | 8/1999 | Kim | 348/448 |
| 5,959,681 A | * | 9/1999 | Cho | 348/452 |
| 6,014,182 A | * | 1/2000 | Swartz | 348/700 |

(Continued)

OTHER PUBLICATIONS

A motion adaptive method disclosed in IEEE Transactions on Consumer Electronics, pp. 110-114, May 1990 by C. Markhauser.

*Primary Examiner*—Brian P. Yenke
(74) *Attorney, Agent, or Firm*—Michael Zarrabian, Esq.; Kenneth L. Sherman, Esq.; Myers Dawes Andras & Sherman, LLP

(57) ABSTRACT

Interlaced video signals are processed by mixing spatially interpolated video signals with temporally interpolated video signals. The respectively interpolated signals are mixed in dependence on a degree of motion at the given location in the video picture, as defined by a motion decision parameter. In order to dependably determine whether motion is to be taken into account in a current frame, motion decisions of previous frames are taken into account. That is, to define the motion decision parameter and to exclude false determinations, the motion decision parameter is computed recursively, by taking into account motion decision parameters of the associated previous fields.

21 Claims, 15 Drawing Sheets

U.S. PATENT DOCUMENTS

| | | | |
|---|---|---|---|
| 6,034,734 A * | 3/2000 | De Haan et al. | 348/458 |
| 6,061,100 A * | 5/2000 | Ward et al. | 348/607 |
| 6,122,017 A * | 9/2000 | Taubman | 348/620 |
| 6,266,092 B1 * | 7/2001 | Wang et al. | 348/448 |
| 6,275,259 B1 * | 8/2001 | Gowda et al. | 348/229.1 |
| 6,288,745 B1 * | 9/2001 | Okuno et al. | 348/448 |
| 6,295,091 B1 * | 9/2001 | Huang | 348/448 |
| 6,307,560 B1 * | 10/2001 | Kondo et al. | 345/619 |
| 6,335,990 B1 * | 1/2002 | Chen et al. | 382/261 |
| 6,340,990 B1 * | 1/2002 | Wilson | 348/448 |
| 6,348,949 B1 * | 2/2002 | McVeigh | 348/452 |
| 6,396,876 B1 * | 5/2002 | Babonneau et al. | 375/240.09 |
| 6,414,719 B1 * | 7/2002 | Parikh | 348/448 |
| 6,421,090 B1 * | 7/2002 | Jiang et al. | 348/452 |
| 6,452,972 B1 * | 9/2002 | Ohara | 375/240.12 |
| 6,512,550 B1 * | 1/2003 | de Garrido et al. | 348/452 |
| 6,621,936 B1 * | 9/2003 | Kondo et al. | 382/260 |
| 6,630,961 B1 * | 10/2003 | Shin et al. | 348/448 |
| 6,633,612 B1 * | 10/2003 | Selby | 375/240.16 |
| 6,636,267 B1 * | 10/2003 | Adachi | 348/448 |
| 6,647,062 B1 * | 11/2003 | Mackinnon | 375/240.16 |
| 6,681,054 B1 * | 1/2004 | Gindele | 382/272 |
| 6,754,371 B1 * | 6/2004 | Kondo et al. | 382/107 |
| 6,788,823 B1 * | 9/2004 | Allred et al. | 382/260 |
| 6,795,123 B1 * | 9/2004 | Gotanda et al. | 348/448 |
| 6,822,691 B1 * | 11/2004 | Kim et al. | 348/452 |
| 6,829,013 B1 * | 12/2004 | Thompson et al. | 348/448 |
| 6,847,405 B1 * | 1/2005 | Hsu et al. | 348/452 |
| 6,859,237 B1 * | 2/2005 | Swartz | 348/700 |
| 6,909,466 B1 * | 6/2005 | Scheffler et al. | 348/459 |
| 2002/0027610 A1 * | 3/2002 | Jiang et al. | 348/448 |
| 2004/0184541 A1 * | 9/2004 | Brockmeyer et al. | 375/240.16 |
| 2004/0196901 A1 * | 10/2004 | Demos | 375/240 |
| 2004/0202245 A1 * | 10/2004 | Murakami et al. | 375/240 |

* cited by examiner

METHOD AND APPARATUS FOR DETECTING REPETITIVE MOTION IN AN INTERLACED VIDEO SEQUENCE APPARATUS FOR PROCESSING INTERLACED VIDEO SIGNALS

CROSS-REFERENCES TO RELATED APPLICATIONS

Applicants claim the benefit of U.S. Provisional Application No. 60/257,338 entitled "Methods of Detecting Motion in an Interlaced Video Sequence Based on Logical Operation on the Linearly Scaled Motion Information and the Apparatus Therefor," filed Dec. 20, 2000, U.S. Provisional Application No. 60/257,365 entitled "Methods of Detecting Motion in an Interlaced Video Sequence Utilizing Region-Wise Motion and Apparatus" filed Dec. 20, 2000, and U.S. Provisional Application No. 60/273,100 entitled "Method of Detecting Repetitive Motion In An Interlaced Video Sequence and Apparatus Therefor," filed Mar. 2, 2001, which applications are incorporated herein by reference.

BACKGROUND OF THE INVENTION

FIELD OF THE INVENTION

The invention lies in the signal processing field. More specifically, the invention pertains to a method of detecting motion in an interlaced video sequence. The invention is particularly applicable to the computation of a motion decision value in an interlaced video signal and to a method of interpolating video signal information from existing video signal information. The invention also pertains to an apparatus for performing the method.

In the development of current Digital TV (DTV) systems, it is essential to employ video format conversion units due to the variety of video formats that are adopted in many different DTV standards worldwide. For instance, the ATSC DTV standard system of the North America adopted 1080× 1920 interlaced video, 720×1280 progressive video, 720× 480 interlaced and progressive video, and etc. as its standard video formats for digital TV broadcasting. Video format conversion, in this context, means to convert an incoming video format to a specified output video format to properly present the video signal on a displaying device such as a monitor, FLCD, or a plasma display, which has a fixed resolution. Designing a good video format conversion system is of significant importance since it can directly affect the visual quality of the video of a DTV receiver. Fundamentally, the video format conversion operation requires advanced algorithms for multi-rate system design in which poly-phase filter design and interlaced to progressive scanning rate conversion or simply deinterlacing are of importance.

Historically, deinterlacing algorithms were developed to enhance the video quality of NTSC/PAL TV receivers by reducing the intrinsic annoying artifacts of the interlaced video signal such as a serrate line observed when there is a motion between fields, line flickering, raster line visibility, and field flickering, where deinterlacing represents an operation that doubles the vertical scanning rate of the interlaced video signal. Besides, as mentioned above, the remarkable development of digital TV systems worldwide has raised the importance of the 3-D deinterlacing algorithms for the format conversion. For instance, it is highly demanded that 480 line interlaced video format needs to be up-converted to 720-line progressive or to 1080-line interlaced format in the ATSC system. In such case, it is well-known that pre-up-conversion to 480-line progressive—which is deinterlacing, as will be described in the following—provides more pleasing video quality than the direct up-conversion especially when a highly elaborate 3-D deinterlacing algorithm is incorporated.

The fundamental notion behind a 3-D deinterlacing algorithm based on motion detection is to cope with the theoretical limit of the sampling theorem embedded in the interlaced video sequence by properly detecting the point-wise motion of objects in the sequence. Some 3-D deinterlacing methods are found in the following prior art references:

[1] "Motion adaptive pro-scan converter with two dimensional contour enhancement," in IEEE Transactions on Consumer Electronics, pp. 110–114, May 1990 by C. Markhauser.

[2] Interlaced to progressive conversion apparatus and method using motion and spatial correlation, Young-Taeg Kim, U.S. Pat. No. 5,943,099, Aug. 24, 1999.

[3] Motion picture detecting method, Yong-Hun Cho, U.S. Pat. No. 5,959,681, Sep. 28, 1999.

The premise underlying the methods described in the references [1], [2], and [3] is to estimate a motion decision factor based on a frame difference signal in principle. Although these methods utilize motion detection schemes to overcome the limit of the sampling theorem and as a consequence to provide better interpolation for the deinterlacing, there exists a theoretical limit in detecting real motion in the interlaced video sequence due to the intrinsic nature of an interlaced video sequence. To be specific, those motion detection methods will fail to detecting motion when fast repetitive motion is presented in a given interlaced video sequence. In other words, those methods will determine that no motion is present, where in fact fast repetitive motion is present, and therefore perform a temporal interpolation.

Repetitive motion can be easily observed when a pattern-like object is moving. This is illustrated in FIG. 1 where the shaded oval represents an object which moves up and down rapidly over a constant background, and where the object is spatio-temporally sampled in accordance with the interlaced sampling system. Observe that in this example a repetitive motion is presented during some time interval. In FIG. 1, the black circles represent the sampled lines whereas the lightly shaded circles represent the missed sampling lines that need to be interpolated. Assuming, for instance, the motion detection in this sequence is estimated by simply taking the field difference, no motion shall be detected at the point "b" in FIG. 1 since the sample values of "a" and "c" are from the constant background and, thus, the difference between them will be zero, meaning "no motion". Based on such "no motion" information, if we interpolate "b" with the sample value of "c", which is a typical case of motion detection based 3-D deinterlacing method, an artifact will appear since the resulting deinterlaced image will look like the background appears inside the object. If the object is composed of apparent signal levels from the signal level of the background, the artifact will be more visible. Hence, it is desirable to detect such motion and use a spatial interpolation rather than the temporal interpolation in order to lessen such artifact. For this example, if we further consider the motion in the previous fields such as the difference signal denoted as "d" and "e" in FIG. 1, in which the difference signal "e" clearly indicates motion, and, thus, if we decide that there possibly exists fast repetitive motion around the point "b" the decision is made to use more spatial interpolation, so that the artifact can be lessened. Conversely, when certain motion is detected (at the point "f" in FIG. 1), propagating this motion information to the next associated points in the future fields for the motion detection is the fundamental notion of the method in this invention.

As we presented in the above, it is well studied that the impact of applying a temporal interpolation based on a misjudged motion detection method is a serious disparagement of the picture. An unacceptable amount of visually annoying artifacts can occur in the temporal interpolation if the motion is not precisely detected.

SUMMARY OF THE INVENTION

It is accordingly an object of the invention to provide a method and an apparatus for detecting repetitive motion in an interlaced video sequence, which overcomes the above-mentioned disadvantages of the heretofore-known devices and methods of this general type and which provide for a robust method of estimating a motion decision parameter which is associated with the point to point degree of motion including rapid and repetitive motion in the interlaced video sequence by further considering the motion information of the previous fields in a recursive fashion. It is another object of the invention to disclose a robust 3-D deinterlacing method and apparatus which utilizes the recursive motion decision parameter of the invention.

With the foregoing and other objects in view there is provided, in accordance with the invention, a method of computing a motion decision value in a video signal processing system. The method comprises the following steps:
  inputting a video signal with an interlaced video sequence of fields;
  comparing mutually corresponding fields and defining a point-wise non-recursive motion decision parameter indicating motion at a given point between a previous field and a next field in the video sequence;
  computing a recursive motion decision parameter by combining the non-recursive motion decision parameter with a motion decision parameter of at least one associated previous field; and
  outputting the recursive motion decision parameter for further processing in the video signal processing system.

In accordance with an added feature of the invention, the step of forming the point-wise motion decision parameter comprises computing $$f_n(i,h) = l_K(d_n(i,h))$$

where $f_n(\bullet)$ is a point-wise motion detection signal, i and h define a spatial location of the respective video signal value in a cartesian matrix, and $l_K(\bullet)$ denotes a linearly scaling function.

In accordance with an additional feature of the invention, motion information of the associated previous fields is taken into account in defining a current motion defined by the recursive motion decision parameter.

In accordance with another feature of the invention, the recursive motion decision parameter $M_n(i,h)$ is in the form of $$M_n(i,h) = F(m_n(i,h), M_{n-2}(i,h))$$

where $F(\bullet)$ represents a monotonous function with respect to $M_n(i,h)$ and $M_{n-2}(i,h)$ having imposed thereon the following condition:

$$\min(m_n(i,h), M_{n-2}(i,h)) \leq F(m_n(i,h), M_{n-2}(i,h)) \leq \max(m_n(i,h), M_{n-2}(i,h)).$$

In accordance with a further feature of the invention, a non-recursive motion detection signal is computed from the point-wise motion detection parameter by an equation selected from the group consisting of $$\phi_n(i,h) = f_n(i,h) + \min(f_{n-1}(i-1,h), f_{n-1}(i+1,h))$$

$$\phi_n(i,h) = \mathrm{med}(f_n(i,h), f_{n-1}(i-1,h), f_{n-1}(i+1,h))$$

$$\phi_n(i,h) = \max(f_n(i,h), f_{n-1}(i-1,h), f_{n-1}(i+1,h))$$

where $f_{n-1}(\bullet)$ denotes a motion detection signal delayed by one field, $\mathrm{med}(\bullet)$ denotes a median operation, $\max(\bullet)$ denotes an operation to minimize an error from a false motion detection, and the indices i and h define a spatial location of the respective video signal value in a cartesian matrix.

There is also provided, in accordance with the invention, a method of processing interlaced video signals, which comprises:
  spatially interpolating a value of the video signal at a given location from a video signal of at least one adjacent location in a given video field;
  temporally interpolating the value of the video signal at the given location from a video signal at the same location in temporally adjacent video fields;
  forming a recursive motion decision value for the same location as outlined above; and
  mixing an output signal for the video signal at the given location from the spatially interpolated signal and the temporally interpolated signal and weighting the output signal in accordance with the recursive motion decision value.

In accordance with again an added feature of the invention, the motion decision value is varied between 0 and 1 as a function of an estimate of the degree of motion at the given location and, upon estimating a high degree of motion, heavily weighting the output signal towards the spatially interpolated signal and, upon estimating a low degree of motion, heavily weighting the output signal towards the temporally interpolated signal.

In accordance with again an additional feature of the invention, the spatially interpolated signal is output as the output signal upon estimating a high degree of motion, and the temporally interpolated signal is output as the output signal upon estimating a low degree of motion.

With the above and other objects in view there is also provided, in accordance with the invention, an apparatus for computing a motion decision value in a video processing system. The apparatus comprises:
  an input for receiving a video signal with an interlaced video sequence of successive fields;
  a non-recursive motion detection unit connected to receive the video signal and to compute and output a non-recursive motion decision parameter defining a motion difference between a previous field and a next field of a current field to be deinterlaced;
  a recursive motion detection unit connected to receive the non-recursive motion decision parameter and configured to compute a recursive motion decision parameter by combining the non-recursive motion decision parameter with a motion decision parameter of at least one associated previous field.

In accordance with yet an added feature of the invention, the recursive motion detection unit is configured to take into account motion information of the associated previous fields in defining a current motion defined by the recursive motion decision parameter.

The apparatus according to the invention is configured to carry out the method as outlined above.

The apparatus for processing interlaced video signals according to the invention comprises:

an input for receiving a video signal with an interlaced video sequence of fields;

a spatial interpolator connected to said input and configured to spatially interpolate a value of the video signal at a given location from a video signal of at least one adjacent location in a given video field;

a temporal interpolator connected to said input in parallel with said spatial interpolator for temporally interpolating the value of the video signal at the given location from a video signal at the same location in temporally adjacent video fields;

a processing apparatus as outlined above connected to said input and in parallel with said spatial interpolator and said temporal interpolator for forming a motion decision value for the same location; and a mixer connected to receive an output signal from each of said spatial interpolator, said temporal interpolator, and said computing apparatus, said mixer being configured to mix an output signal for the video signal at the given location from the spatially interpolated signal and the temporally interpolated signal in dependence on the recursive motion decision value output by said processing apparatus.

Other features which are considered as characteristic for the invention are set forth in the appended claims.

Although the invention is illustrated and described herein as embodied in a method and an apparatus for detecting repetitive motion in an interlaced video sequence and an apparatus for processing interlaced video signals, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
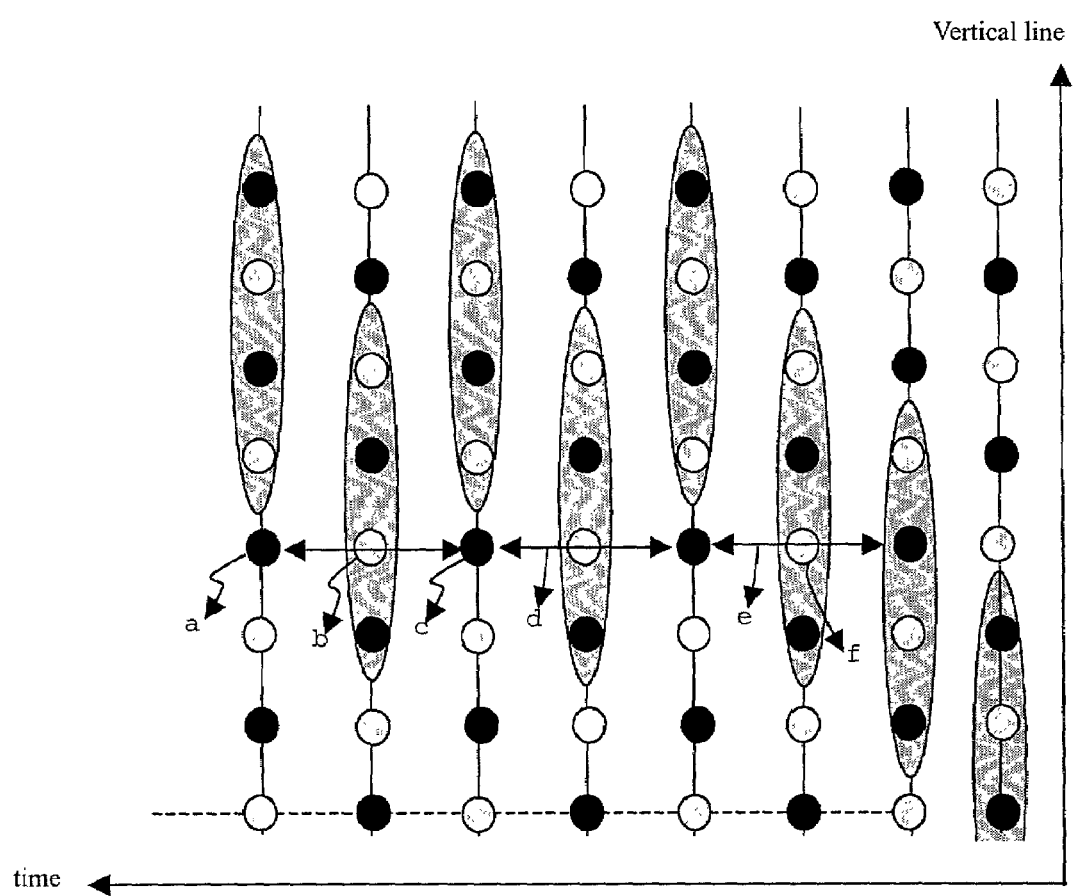
FIG. 1 is a schematic illustrating fast motion in an interlaced video sequence.
Figure 2:
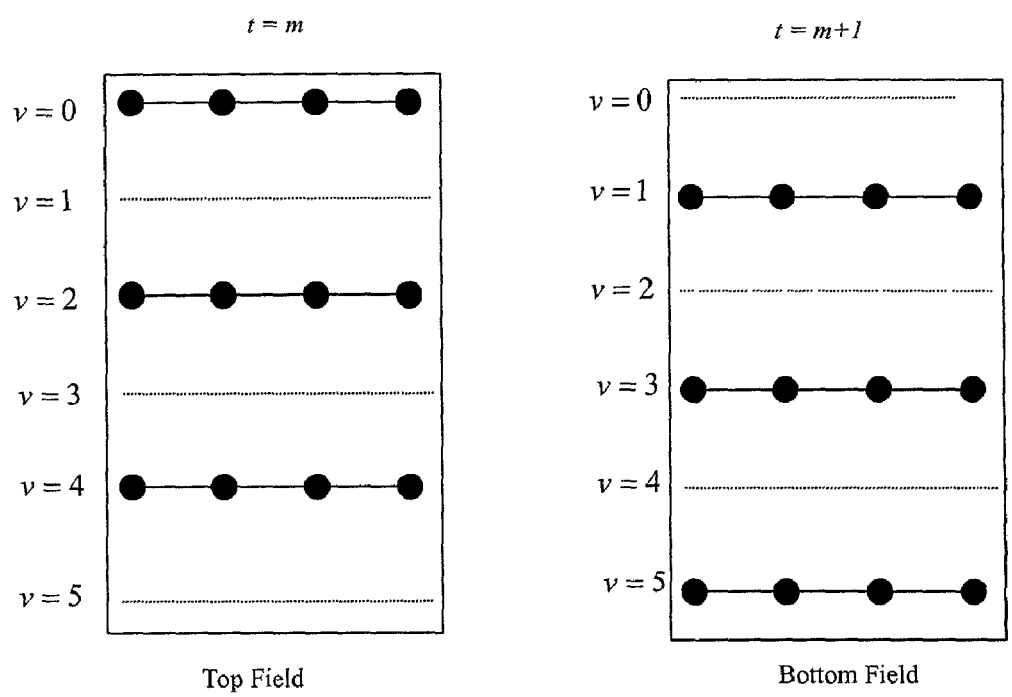
FIG. 2 is a schematic view of a top field and a bottom field of an interlaced video signal.

In order to systematically describe the deinterlacing problem and the methods of the present invention, let $x_n$ denote the incoming interlaced video field at a time instant t=n and $x_n(v,h)$ denote the associated value of the video signal at the geometrical location (v,h), where v represents vertical location and h represents horizontal location. By the definition of the interlaced video signal, it can be said that the signal values of $x_n$ are available only for the even lines, i.e., v=0,2,4, . . . , if $x_n$ is a top field. Similarly the signal values of $x_n$ are available only for the odd lines of v (i.e., v=1,3,5, . . . ) if $x_n$ is a bottom field. Conversely, the signal values of $x_n$ are not available for odd lines if $x_n$ is a top field signal and the signal values of $x_n$ are not available for even lines if $x_n$ is a bottom field. Pictorial description of the top and bottom fields of the interlaced video signal is illustrated in FIG. 2 where the image at t=m represents the top field and the image at t=m+1 represents the bottom field of an interlaced video sequence.

Based upon the description of the interlaced video signal, the deinterlacing problem can be stated as a process to reconstruct or interpolate the unavailable signal values in each field. That is, the deinterlacing problem is to reconstruct the signal values of $x_n$ at odd lines (v=1,3,5, . . . ) for the top field $x_n$ and to reconstruct the signal values of $x_n$ at even lines (v=0,2,4, . . . ) for the bottom field $x_n$.

Figure 3:
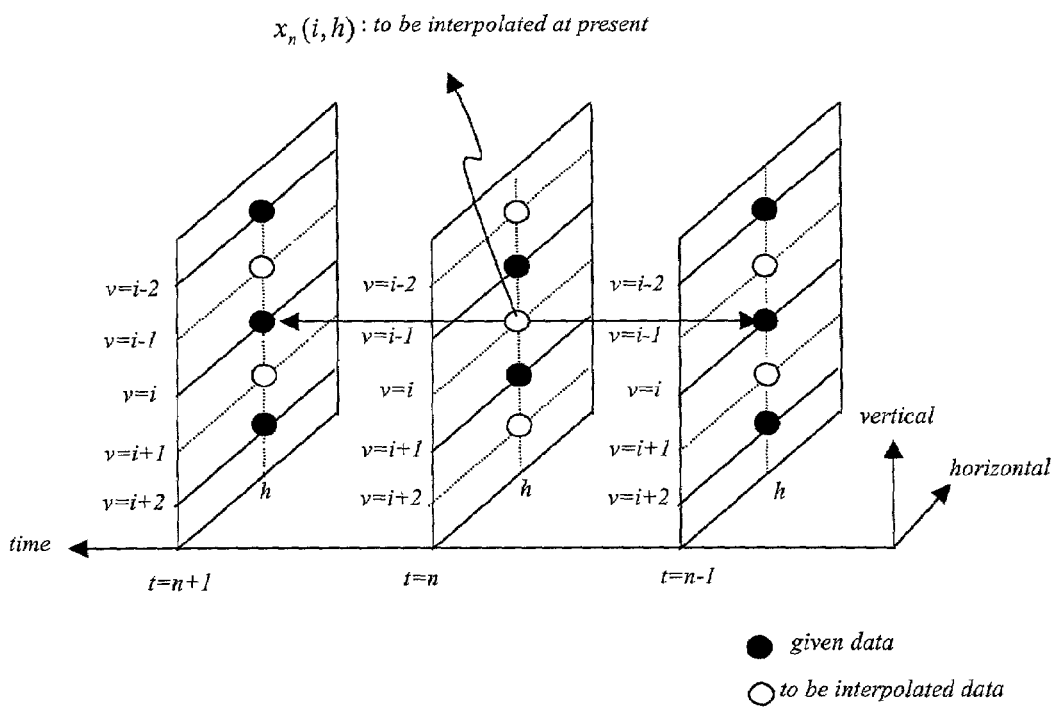
FIG. 3 is a schematic diagram illustrating three successive fields of an interlaced video sequence.

For the simple description of the present invention, the deinterlacing problem will be simplified as a process which reconstructs or interpolates the unavailable signal value of $x_n$ at the $i^{th}$ line where the signal values of the lines at i±1,i±3,i±5, . . . are available. More simply, deinterlacing is to interpolate the value of $x_n(i,h)$, which is not originally available. Note that, since $x_{n-1}$ and $x_{n+1}$ have a different sampling phase from $x_n$, the signal values of $x_{n-1}(i,h)$ and $x_{n+1}(i,h)$ are available, which is the fundamental fact why motion detection can be incorporated with the deinterlacing problem. This relation is depicted in FIG. 3, where dotted lines (or, white circles) represent "no data available" and the solid lines (or, black circles) represent "available data".

A motion decision (or, detection) parameter is estimated from the incoming interlaced video sequence and associated with the point-to-point degree of motion in the interlaced video sequence. The importance or the usefulness of the motion decision parameter can be best understood with reference to FIG. 3. Referring to FIG. 3, suppose that we have precise motion information when we want to interpolate $x_n(i,h)$ and suppose that no motion is encountered at the spatial location (i,h), then the best interpolation for $x_n(i,h)$ is to use the value of $x_{n-1}(i,h)$ since the fact that no motion is introduced between t=n−1 and t=n+1 at the spatial location (i,h) most likely implies that the value of $x_n(i,h)$ would be close to the value of $x_{n-1}(i,h)$. The usage of the motion decision parameter of the present invention is also to utilize the motion information for deinterlacing to properly mix the temporal information, which will be disclosed later.

In order to clarify the methods of this invention hereafter for the motion detection in the interlaced video sequence, terminologies for non-recursive motion detection method and a recursive motion detection method are described as follows. A non-recursive motion detection method will be referred to a motion detection method which estimates the motion decision parameter from a few number of fields such as $x_{n-2}$, $x_{n-1}$, $x_n$, and $x_{n+1}$. Let $m_n(i,h)$ denote as the non-recursive motion decision parameter of a typical non-recursive motion detection method for the interpolation of $x_n(i,h)$ which fundamentally utilizes the frame difference signal between $x_{n-1}$ and $x_{n+1}$ and/or further between $x_n$ and $x_{n-2}$. Without loss of generality, it can be said that the value of $m_n(i,h)$ is bounded as $0 \leq m_n(i,h) \leq 1$, where $m_n(i,h)=0$ represents "no motion detected" and $m_n(i,h)=1$ represents "motion detected". Then a motion adaptive deinterlacing method mixes a spatially interpolated value and a temporally interpolated value in accordance with the value of $m_n(i,h)$.

Figure 4:
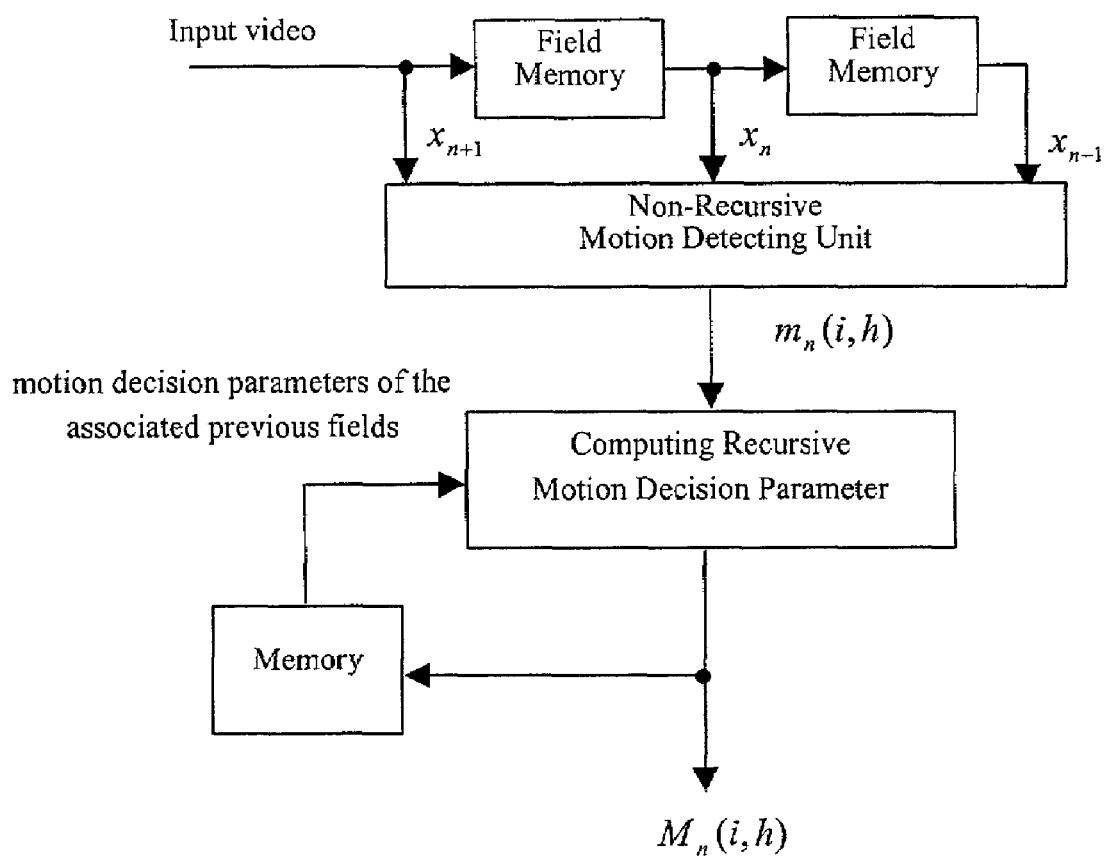
FIG. 4 is a functional block diagram illustrating a recursive motion decision parameter calculation.

In contrast, a recursive motion detection method refers to a motion detection method which further utilizes the motion decision parameters of the previous fields. The functional block diagram of the recursive motion detection method of the present invention is disclosed in FIG. 4, where the non-recursive motion decision parameter, $m_n(i,h)$, is computed from the fields, for instance, $x_{n-1}$, $x_n$, and $x_{n+1}$, where the recursive motion decision parameter which will be denoted as $M_n(i,h)$ is computed with the non-recursive motion decision parameter and the recursive motion decision parameters of the previous fields or frames which are stored in a memory, and where the computed current recursive motion decision parameter, $M_n(i,h)$, is then saved in the memory device. As disclosed in FIG. 4, the recursive motion detection method of the invention does not necessarily limit the non-recursive motion detection method to a specific method. In other words, any existing non-recursive methods can be utilized with the current invention.

In order to specifically describe the present invention for dealing with the fast repetitive motion in the interlaced video sequence, this invention further discloses the recursive motion decision parameter, $M_n(i,h)$, as in the form of $$M_n(i,h) = F(m_n(i,h), M_{n-2}(i,h)) \tag{1}$$

where $F(\bullet)$ represents a monotonous function with respect to $M_n(i,h)$ and $M_{n-2}(i,h)$ onto which the following condition is imposed:

$$\min(m_n(i,h), M_{n-2}(i,h)) \leq F(m_n(i,h), M_{n-2}(i,h)) \leq \max(m_n(i,h), M_{n-2}(i,h)). \tag{2}$$

The fundamental notion behind the expression in Eq. (1) is that the motion information of the associated previous fields are taken into account when the current motion is being decided. In other words, the current motion decision will be made not only investigating the difference between the frames associated with current motion detection but also by looking at the previous-motion information. Conversely, when motion is detected at a certain time, this information will be propagated over the time domain to secure the motion detection thereafter from the possible presence of fast repetitive motion.

As specific embodiments of the recursive motion decision parameter, $M_n(i,h)$, this invention discloses the specific functional forms of $F(\bullet)$ in the following. However, this does not necessarily limit the function $F(\bullet)$ to those forms.

The first specific form of the recursive motion decision parameter, $M_n(i,h)$, is disclosed as $$M_n(i,h) = F(m_n(i,h), M_{n-2}(i,h)) \tag{3}$$
$$= m_n(i,h) \cdot (1-\alpha) + M_{n-2}(i,h) \cdot \alpha$$

where $\alpha$ is a pre-determined constant which controls the characteristics of the recursion and bounded as $0 \leq \alpha < 1$. For instance, no recursion is incorporated when $\alpha=0$ and the degree of recursion is increasing as the value of $\alpha$ approaches 1. Similar to the non-recursive motion decision parameter, the recursive motion decision parameter, $M_n(i,h)$, is bounded as $0 < M_n(i,h) \leq 1$. Also $M_n(i,h)=0$ shall imply "no motion", and $M_n(i,h)=1$ shall imply "motion". Note that $M_n(i,h)$ in Eq. (3) is in the form of an IIR filter structure, and that is the reason why it is referred to as the recursive motion decision parameter. The interpretation of $M_n(i,h)$ given in Eq. (3) is that the motion in the previous fields is taken into consideration when the current motion is detected. The recursive nature of the Eq. (3) can be more easily understood by expressing it as follows:

$$M_n(i,h) = m_n(i,h) \cdot (1-\alpha) + M_{n-2}(i,h) \cdot \alpha$$
$$= m_n(i,h) \cdot (1-\alpha) + (m_{n-2}(i,h) \cdot (1-\alpha) + M_{n-4}(i,h) \cdot \alpha) \cdot \alpha$$
$$= m_n(i,h) \cdot (1-\alpha) + m_{n-2}(i,h) \cdot (1-\alpha) \cdot \alpha + M_{n-4}(i,h) \cdot \alpha^2$$

and further it can be expressed as $$M_n(i,h) = m_n(i,h) \cdot (1-\alpha) + m_{n-2}(i,h) \cdot (1-\alpha) \cdot \alpha + m_{n-4}(i,h) \cdot (1-\alpha) \cdot \alpha^2 + M_{n-6}(i,h) \cdot \alpha^3$$

and so on. Clearly this shows the recursive nature of the motion decision parameter disclosed in Eq. (3).

The second specific form of the recursive motion decision parameter, $M_n(i,h)$, is disclosed as $$M_n(i,h) = F(m_n(i,h), M_{n-2}(i,h)) \tag{4}$$
$$= \begin{cases} m_n(i,h), & \text{if } m_n(i,h) \geq T \\ m_n(i,h) \cdot (1-\alpha) + M_{n-2}(i,h) \cdot \alpha, & \text{otherwise} \end{cases}$$

which is to enforce the motion information when obvious motion is detected by a non-recursive motion detection method (i.e., when $m_n(i,h) \geq T$), and where T is a pre-determined positive constant.

The third specific form of the recursive motion decision parameter, $M_n(i,h)$, is disclosed as $$M_n(i,h) = F(m_n(i,h), M_{n-2}(i,h)) \tag{5}$$
$$= \max(m_n(i,h), m_n(i,h) \cdot (1-\alpha) + M_{n-2}(i,h) \cdot \alpha)$$

where $\max(\bullet)$ represents a two input function which outputs the greater value of its input. The functionality behind the Eq. (5) is to increase the certainty of detecting motion by imposing the greater motion decision value of a non-recursive method and the recursive method to $M_n(i,h)$.

The fourth specific form of the recursive motion decision parameter, $M_n(i,h)$, is disclosed as $$M_n(i, h) = F(m_n(i, h), M_{n-2}(i, h)) \qquad (6)$$
$$= m_n(i, h) \cdot m_n(i, h) + (1 - m_n(i, h)) \cdot (m_n(i, h) \cdot (1 - \alpha) + M_{n-2}(i, h) \cdot \alpha)$$

which is to mix the value of $m_n(i,h)$ and $m_n(i,h) \cdot (1-\alpha) + M_{n-2}(i,h) \cdot \alpha$ depending on the value of $m_n(i,h)$. That is, the value of $M_n(i,h)$ in Eq. (6) approaches $m_n(i,h)$ as $m_n(i,h)$ approaches 1 ("motion") and it approaches the value of $m_n(i,h) \cdot (1-\alpha) + M_{n-2}(i,h) \cdot \alpha$ as $m_n(i,h)$ approaches 0 ("no motion").

So far, recursive motion detection methods of the invention have been disclosed as expressed in Eq. (1) through Eq. (6). As mentioned earlier, the methods of the current invention do not limit the non-recursive methods of motion detection to a specific method. However, in order for the proper embodiments of the current invention, some non-recursive methods of computing motion decision parameter, $m_n(i,h)$, are presented in the following next.

First, the frame difference signal $D_n$ is computed by taking the difference between the fields in one frame interval as $$D_n = |x_{n+1} - x_{n-1}|$$

which associates with the scene change occurred between the fields $x_{n+1}$ and $x_{n-1}$. The frame difference signal is then low pass filtered as $$d_n = LPF(D_n)$$

where $LPF(\bullet)$ represents a low pass filtering process over the input video signal. The M×N kernel, $W_{M \times N}$, in general, of the low pass filter, $LPF(\bullet)$, can be expressed as $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $(w_{11}, \ldots, w_{MN})$ represents a set of predetermined coefficients. It should be mentioned that the characteristic of the $LPF(\bullet)$ can be all pass filter depending on the choice of the kernel $W_{M \times N}$. That is, if the kernel is set as M=N=1 and $w_{11}=1$, the $LPF(\bullet)$ becomes the all pass filter and, thus, $d_n = D_n$, which is equivalent to have no spatial low pass filtering.

Next, a point-wise motion detection signal is computed as $$f_n(i,h) = l_K(d_n(i,h)) \qquad (7)$$

where $l_K(\bullet)$ denotes a linearly scaling function represented as $$l_K(y) = \begin{cases} 1, & \text{if } y \geq K \\ y/K, & \text{otherwise} \end{cases}$$

in which K is a positive constant value.

The simplest non-recursive method of estimating the motion decision parameter is to use the point-wise motion detection directly as the motion detection signal, i.e., $$m_n(i,h) = f_n(i,h). \qquad (8)$$

More elaborate methods of non-recursively computing the motion decision parameter will be outlined in the following.

Next the region-wise motion detection signal is computed from the point-wise motion detection signal as $$\phi_n(i,h) = f_n(i,h) + \min(f_{n-1}(i-1,h), f_{n-1}(i+1,h)) \qquad (9)$$

where $f_{n-1}(\bullet)$ denotes the one field delayed motion detection signal described in Eq. (7).

Or, as an alternative method, we define the region-wise motion detection signal as $$\phi_n(i,h) = \text{med}(f_n(i,h), f_{n-1}(i-1,h), f_{n-1}(i+1,h)) \qquad (10)$$

where $\text{med}(\bullet)$ denotes a median operation. Or, in order to minimize the error from a false motion detection, we define the region-wise motion detection signal as $$\phi_n(i,h) = \max(f_n(i,h), f_{n-1}(i-1,h), f_{n-1}(i+1,h)). \qquad (11)$$

Finally, the region-wise motion detection signal is low pass filtered and forms the non-recursive motion decision parameter $m_n(i,h)$ as $$m_n(i, h) = \sum_{p=-a}^{b} \sum_{q=-c}^{d} \phi_n(i + 2 \times p, h + 2 \times q) \cdot \alpha_{p,q} \qquad (12)$$

where $a,b,c,d \geq 0$ and $\alpha_{p,q}$ represents a set of normalized $$\left( \text{i.e., } \sum_{p=-a}^{b} \sum_{q=-c}^{d} \alpha_{p,q} = 1 \right)$$

predetermined coefficients of an low pass filter. For instance, the kernel of the low pass filter used in Eq. (12) can be $$[\alpha'_{p,q}s] = \begin{bmatrix} 0 & 1/8 & 0 \\ 1/8 & 4/8 & 1/8 \\ 0 & 1/8 & 0 \end{bmatrix}.$$

By adjusting the coefficients of the low pass filter given in Eq. (12), various different characteristics of the motion detection can be realized. This also includes the all pass filter by having $$[\alpha'_{p,q}s] = \begin{bmatrix} 0 & 0 & 0 \\ 0 & 1 & 0 \\ 0 & 0 & 0 \end{bmatrix}$$

which is equivalent to having no low pass filtering.

Figure 6:
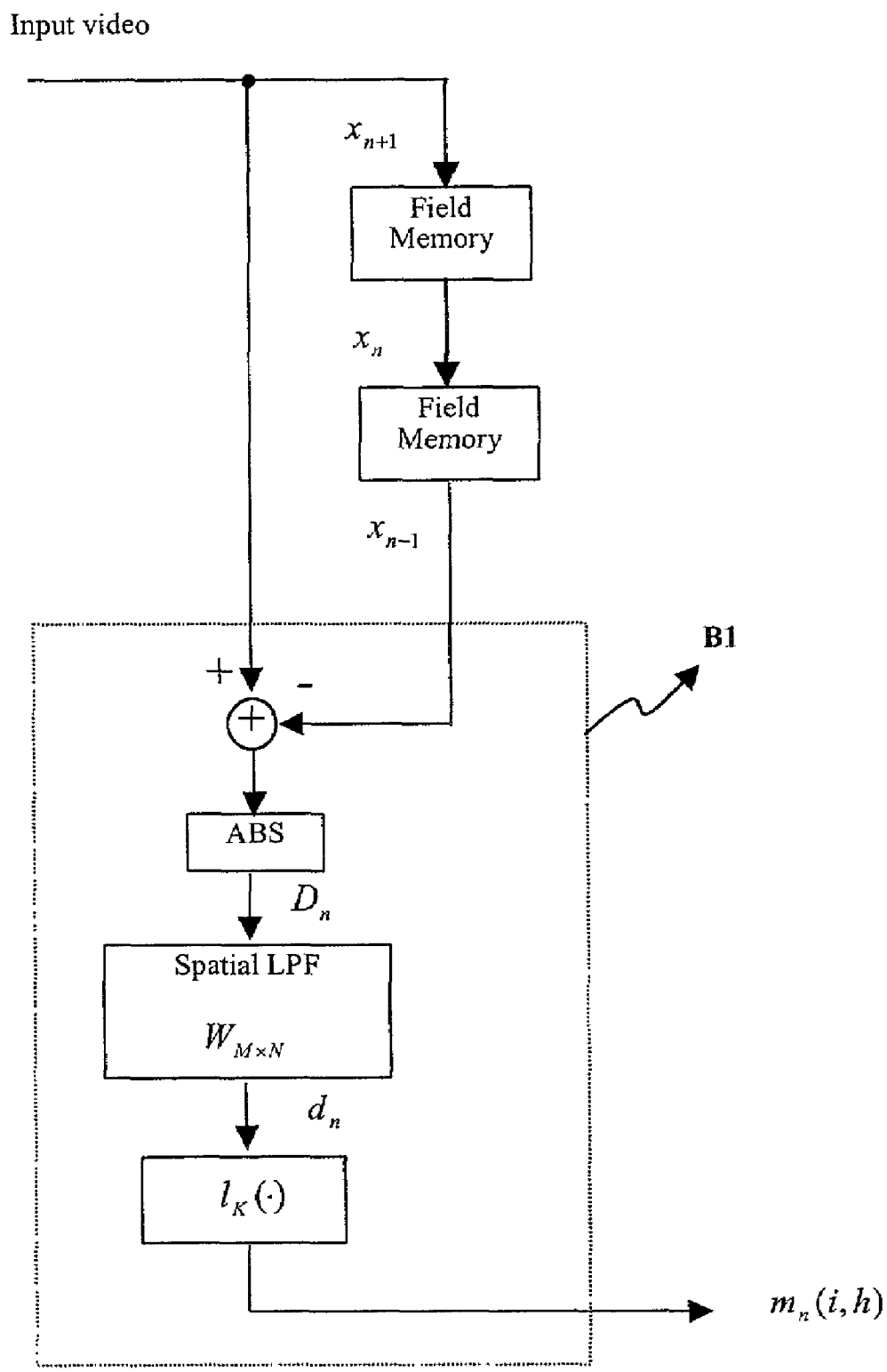
FIGS. 6–9 are block diagrams illustrating the computation of a non-recursive motion decision parameters $m_n(i,h)$ based on various alternative equations and function blocks.

FIG. 6 is a block diagram to compute the non-recursive motion decision parameter $m_n(i,h)$ as described in Eq. (8).

Figure 7:
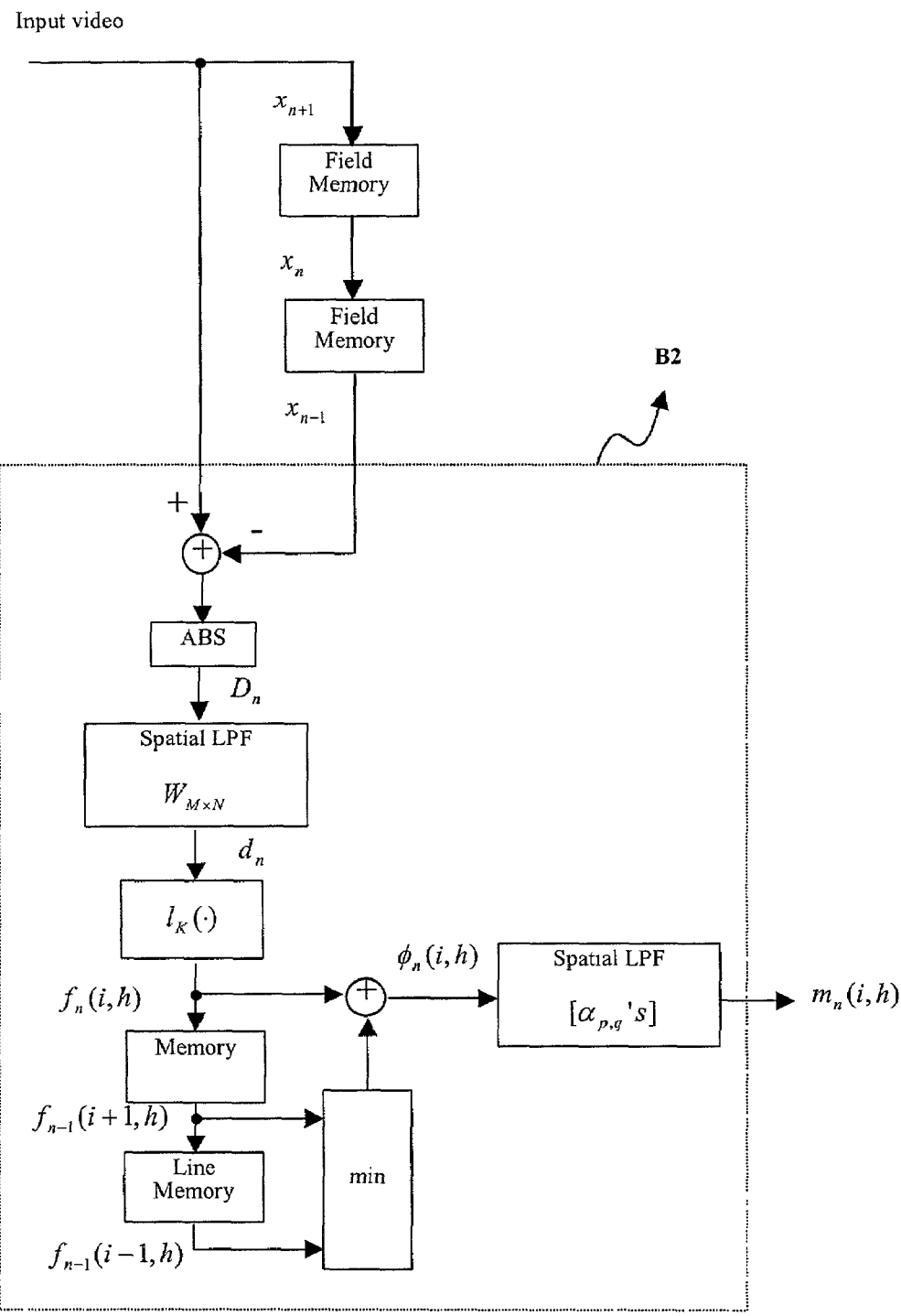

FIG. 7 is a block diagram to compute the non-recursive motion decision parameter $m_n(i,h)$ as described in Eq. (9).

Figure 8:
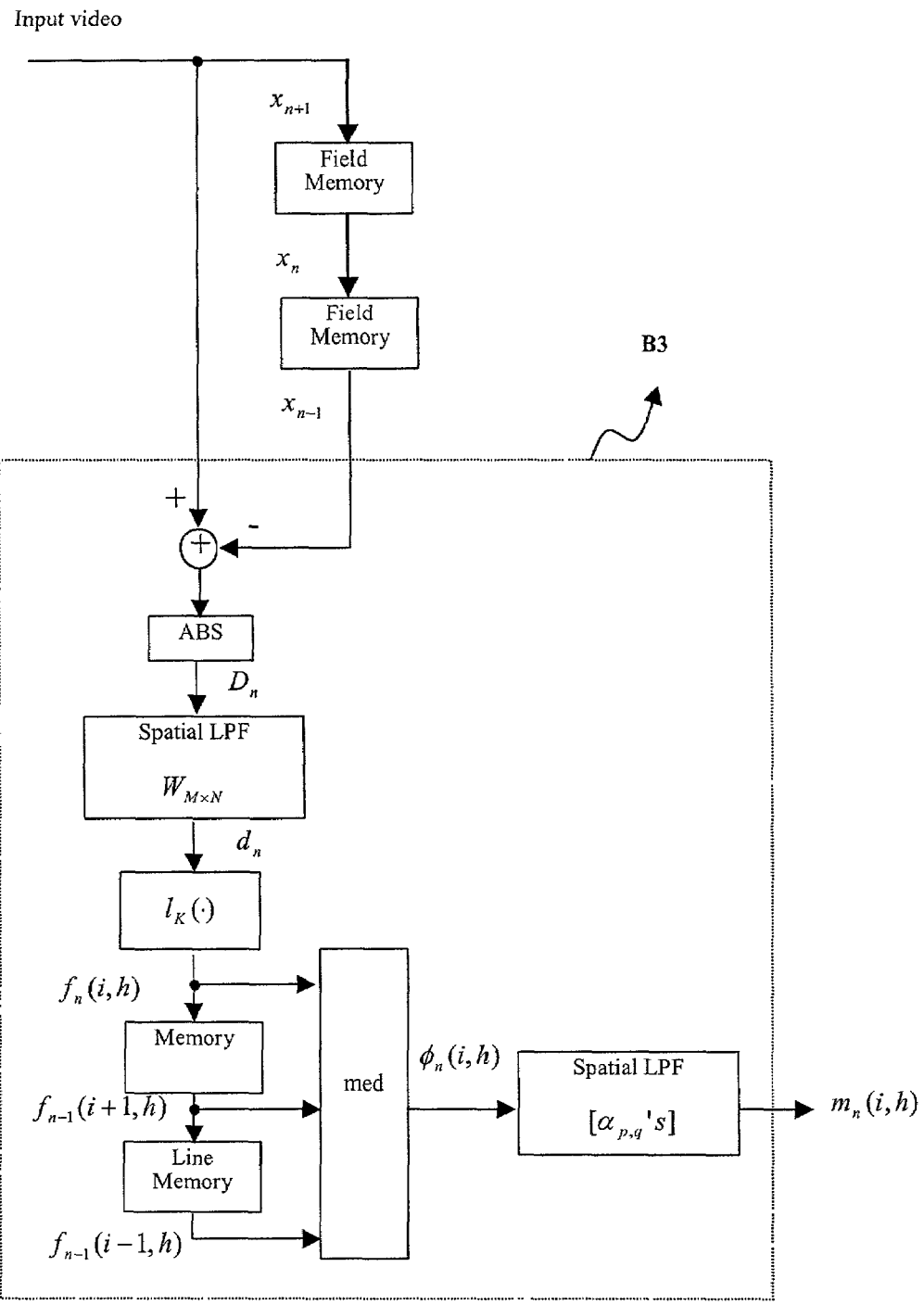

FIG. 8 is a block diagram to compute the non-recursive motion decision parameter $m_n(i,h)$ as described in Eq. (10).

Figure 9:
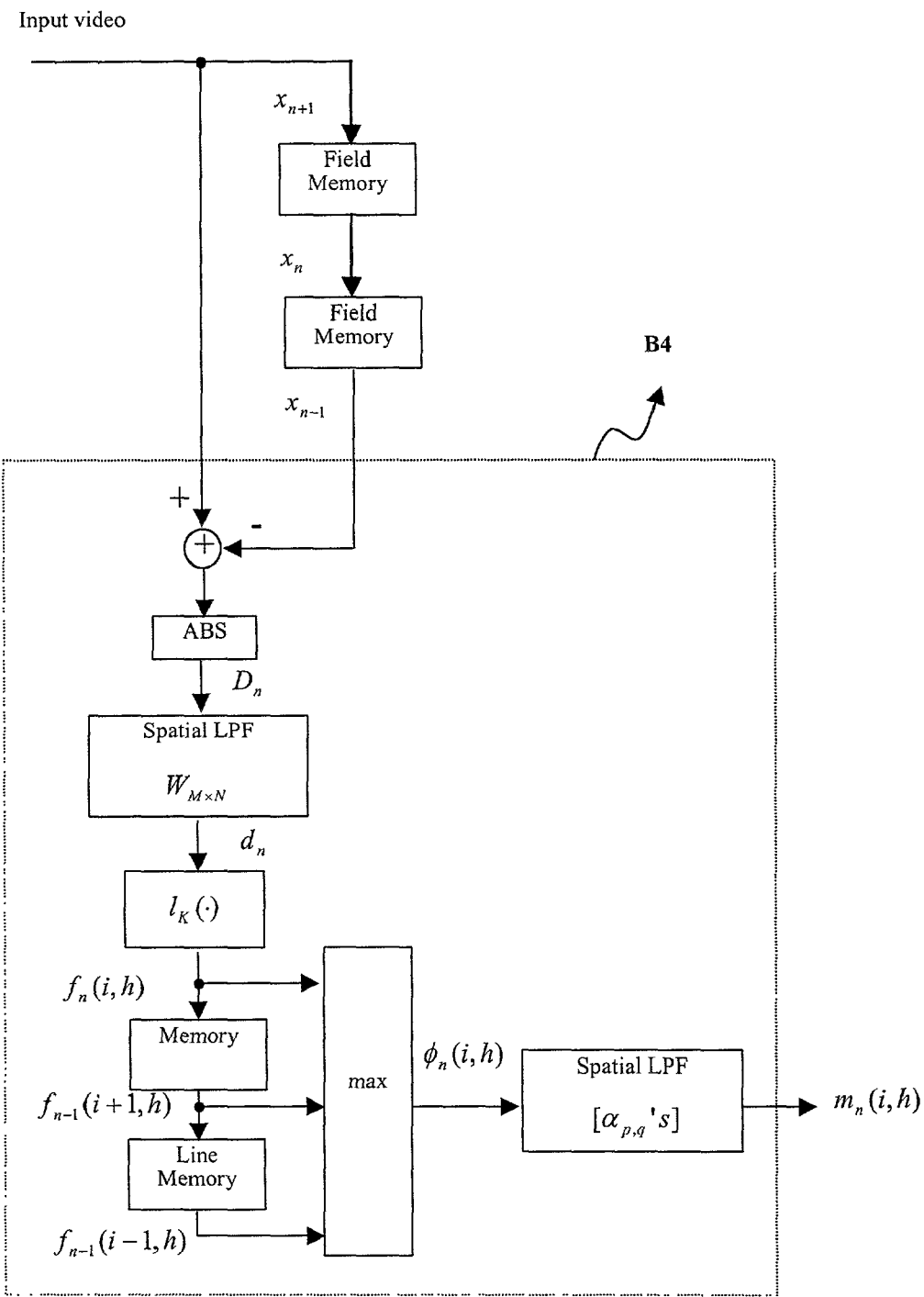

FIG. 9 is a block diagram to compute the non-recursive motion decision parameter $m_n(i,h)$ as described in Eq. (11).

Figure 5:
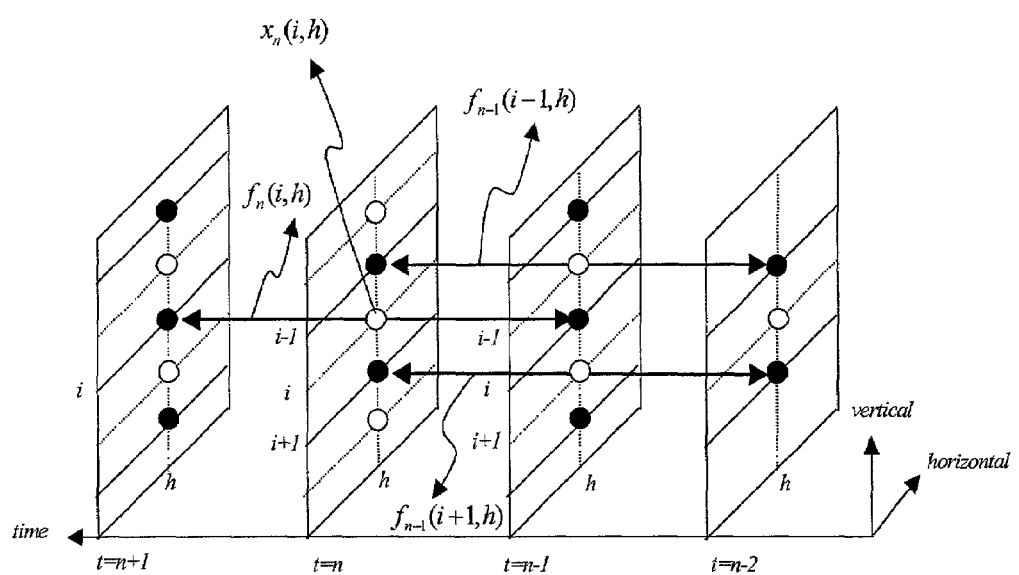
FIG. 5 is a schematic diagram illustrating four successive fields.

Referring now to FIG. 6–9, there is illustrated process by which the non-recursive motion decision parameter $m_n(i,h)$ can be estimated. Fundamentally, $m_n(i,h)$ is estimated from the incoming interlaced video sequence and associated with the point-to-point degree of motion in the interlaced video sequence. The importance or the usefulness of estimating $m_n(i,h)$ can be easily understood from FIGS. 3 and 5. Suppose that precise motion detection information is available when we interpolate $x_n(i,h)$ and suppose there is no motion at the spatial location (i,h), then the best interpolation for $x_n(i,h)$ is to use the value of $x_{n-1}(i,h)$. This follows logically from the fact that no motion is introduced between t=n−1 and t=n+1 at the spatial location (i,h), which very strongly implies that the value of $x_n(i,h)$ would be close to the value of $x_{n-1}(i,h)$.

First, the frame difference signal $D_n$ is computed by taking the difference between the fields in one frame interval as $D_n=|x_{n+1}-x_{n-1}|$ which associates with the scene change that occurred between the fields $x_{n+1}$ and $x_{n-1}$. The frame difference signal is then low pass filtered to form $d_n=\text{LPF}(D_n)$ where LPF(•) represents a low pass filtering process over the input video signal. The M×N kernel, $W_{M\times N}$, in general, of the low pass filter LPF(•), can be expressed as $$W_{M\times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $(W_{11}, \ldots, W_{MN})$ represents a set of predetermined coefficients. It should be mentioned that the characteristic of the LPF (•) can be all-pass filter depending on the choice of the kernel $W_{M\times N}$. That is, if the kernel is set as M=N=1, and $W_{11}=1$, the LPF(•) becomes an all-pass filter and, thus, $d_n=D_n$.

Next, a point-wise motion detection signal is computed as $f_n=(i,h)=l_K(d_n(i,h))$ where $l_K(\bullet)$ denotes a linearly scaling function represented as $$l_K(y) = \begin{cases} 1, & \text{if } y \geq K \\ y/K, & \text{otherwise} \end{cases},$$

with K being a positive constant.

As illustrated in FIG. 6, the function unit B1 may at this time output the non-recursively calculated motion decision parameter $m_n(i,h)$ for further use in the system. In a refined embodiment of the invention, as illustrated in FIG. 7, the function unit B2 may next compute the region-wise motion detection signal from the point-wise motion detection signal as defined in Eq. (9)—$\phi_n(i,h)=f_n(i,h)+\min(f_{n-1}(i-1,h),f_{n-1}(i+1,h))$, where $f_{n-1}(\bullet)$ denotes the one field delayed motion detection signal described in (7). The alternative method is illustrated in FIG. 8 with the function unit B3, where we define the region-wise motion detection signal as defined in Eq. (10)—$\phi_n(i,h)=\text{med}(f_n(i,h),f_{n-1}(i-1,h),f_{n-1}(i+1,h))$, where med(•) denotes a median operation. Or, in order to minimize the error from a false motion detection, we define the region-wise motion detection signal as illustrated in the function block B4 in FIG. 9 as defined in Eq. (11)—$\phi_n(i,h)=\max(f_n(i,h),f_{n-1}(i-1,h),f_{n-1}(i+1,h))$.

Finally, the region-wise motion detection signal is low pass filtered to form the non-recursively computed motion decision parameter $m_n(i,h)$ of Eq. (12).

The various methods were disclosed in the preceding text, of computing recursive motion decision parameter for 3-D deinterlacing combined with non-recursive motion detection methods described in Eq. (8) through (11). In the following, we describe various embodiments of the recursive motion detection methods of the current invention with reference to FIGS. 10–13.

Figure 10:
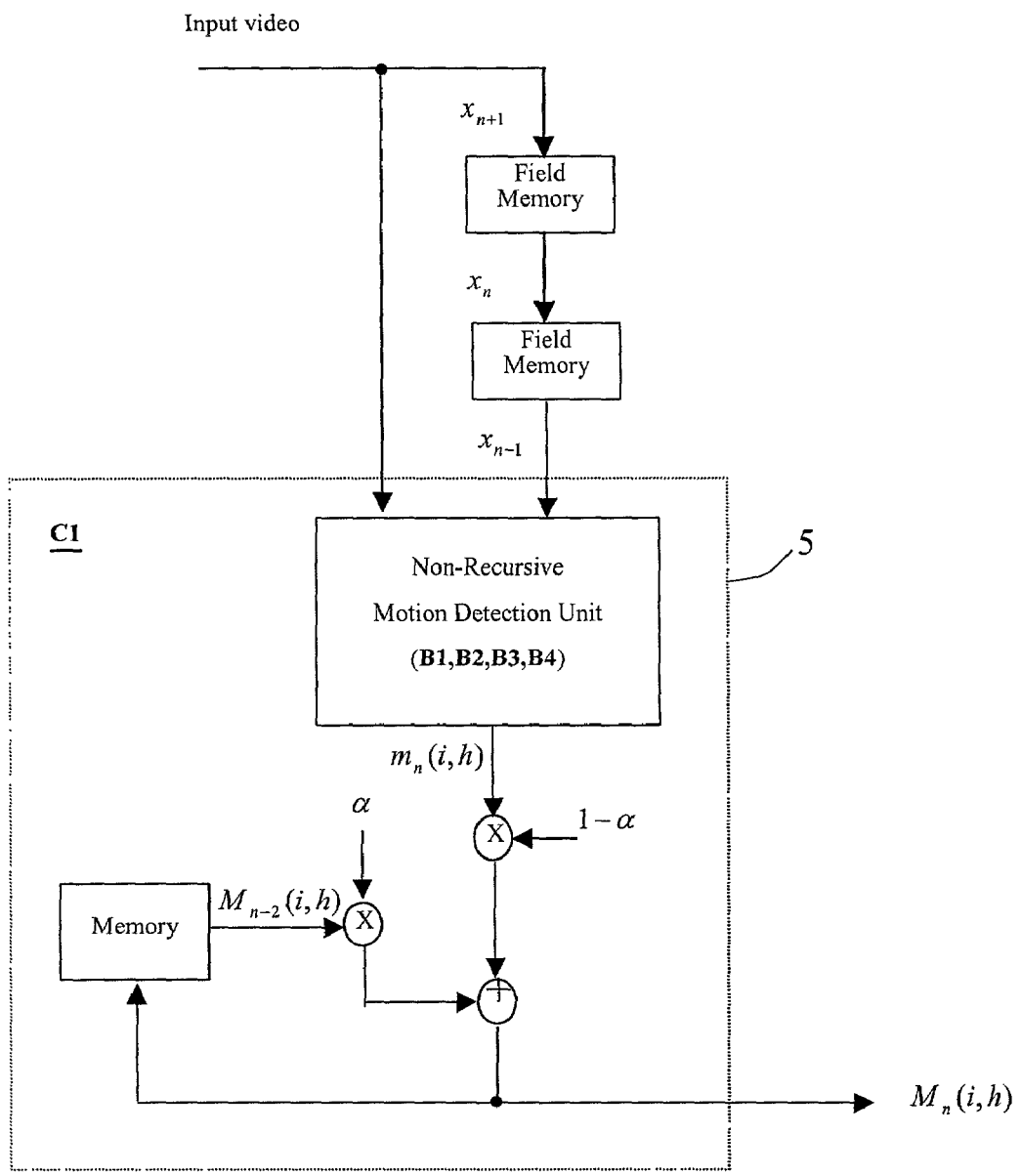
FIGS. 10–13 are block diagrams illustrating the computation of a recursive motion decision parameter $M_n(i,h)$ based on various alternative equations and function blocks, and each based on any of the recursive motion decision parameters $m_n(i,h)$ formed in accordance with FIGS. 6–9.

FIG. 10 discloses the embodiment of the recursive motion detection method based on the non-recursive motion decision parameter disclose in Eq. (3), where the non-recursive motion detection unit can be either the block B1, B2, B3, or B4 in FIG. 6, FIG. 7, FIG. 8, and FIG. 9, respectively.

Figure 11:
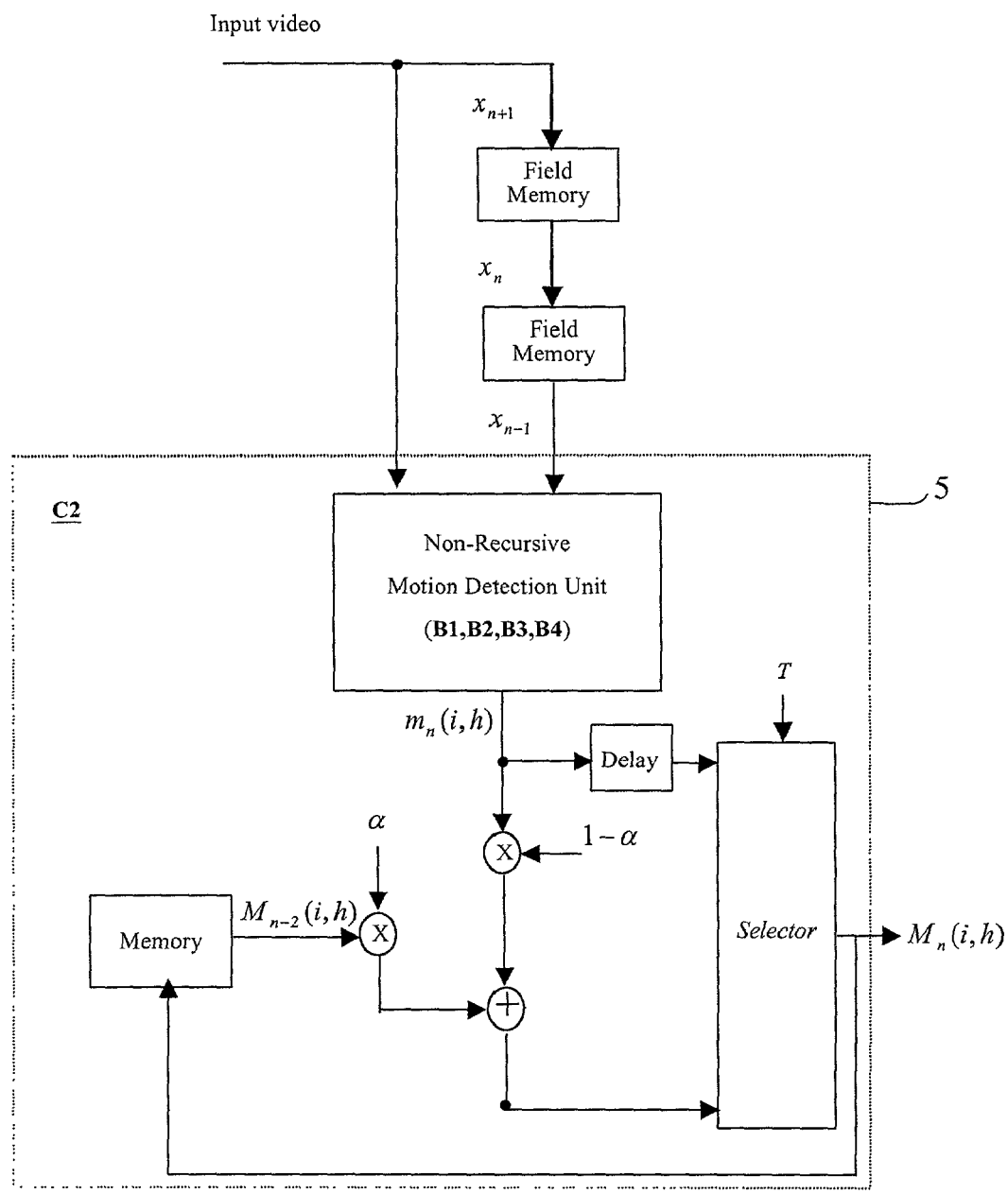

FIG. 11 discloses the embodiment of the recursive motion detection method based on the non-recursive motion decision parameter disclose in Eq. (4), where the non-recursive motion detection unit can be either the block B1, B2, B3, or B4 in FIG. 6, FIG. 7, FIG. 8, and FIG. 9, respectively.

Figure 12:
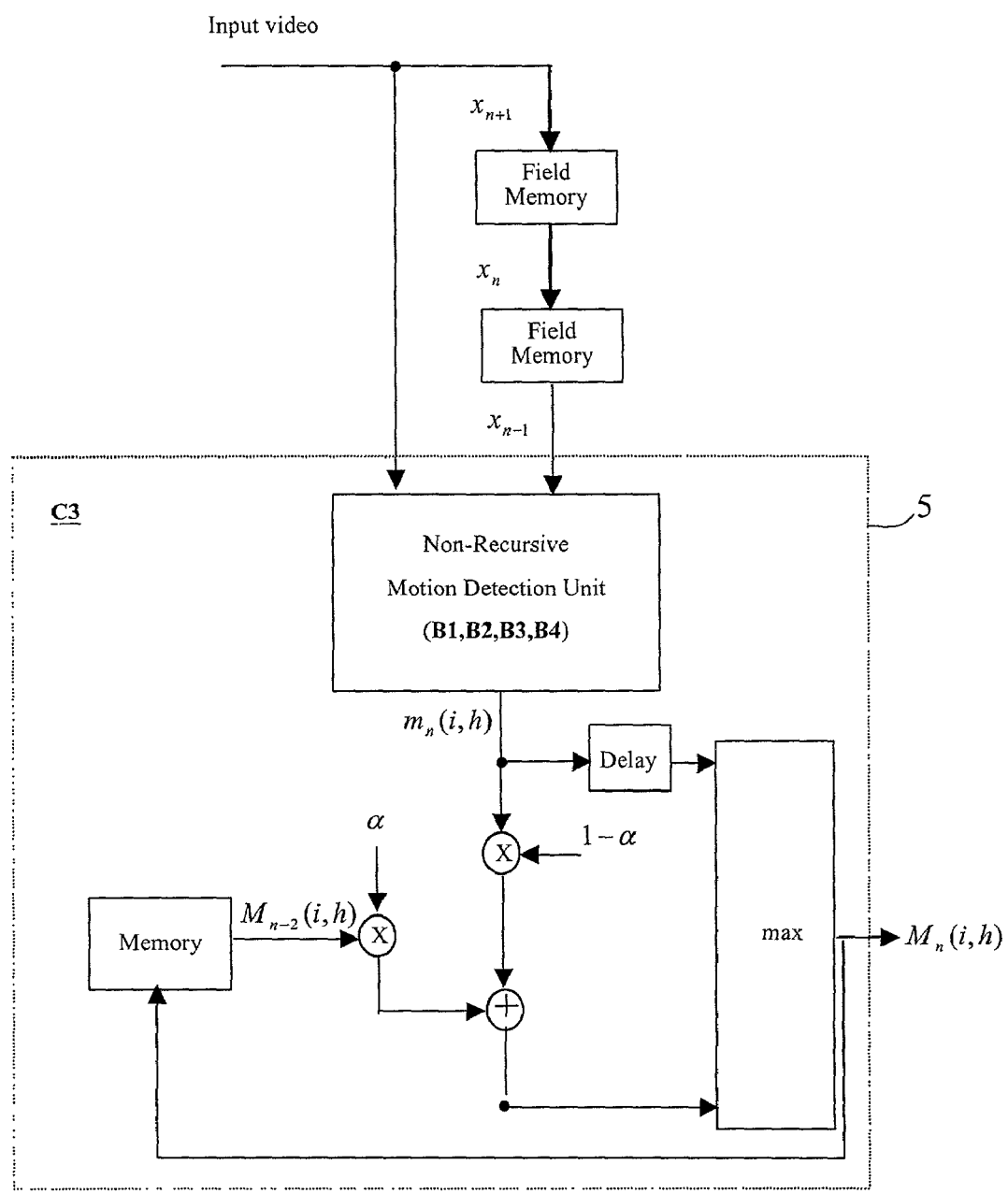

FIG. 12 discloses the embodiment of the recursive motion detection method based on the non-recursive motion decision parameter disclose in Eq. (5), where the non-recursive motion detection unit can be either the block B1, B2, B3, or B4 in FIG. 6, FIG. 7, FIG. 8, and FIG. 9, respectively.

Figure 13:
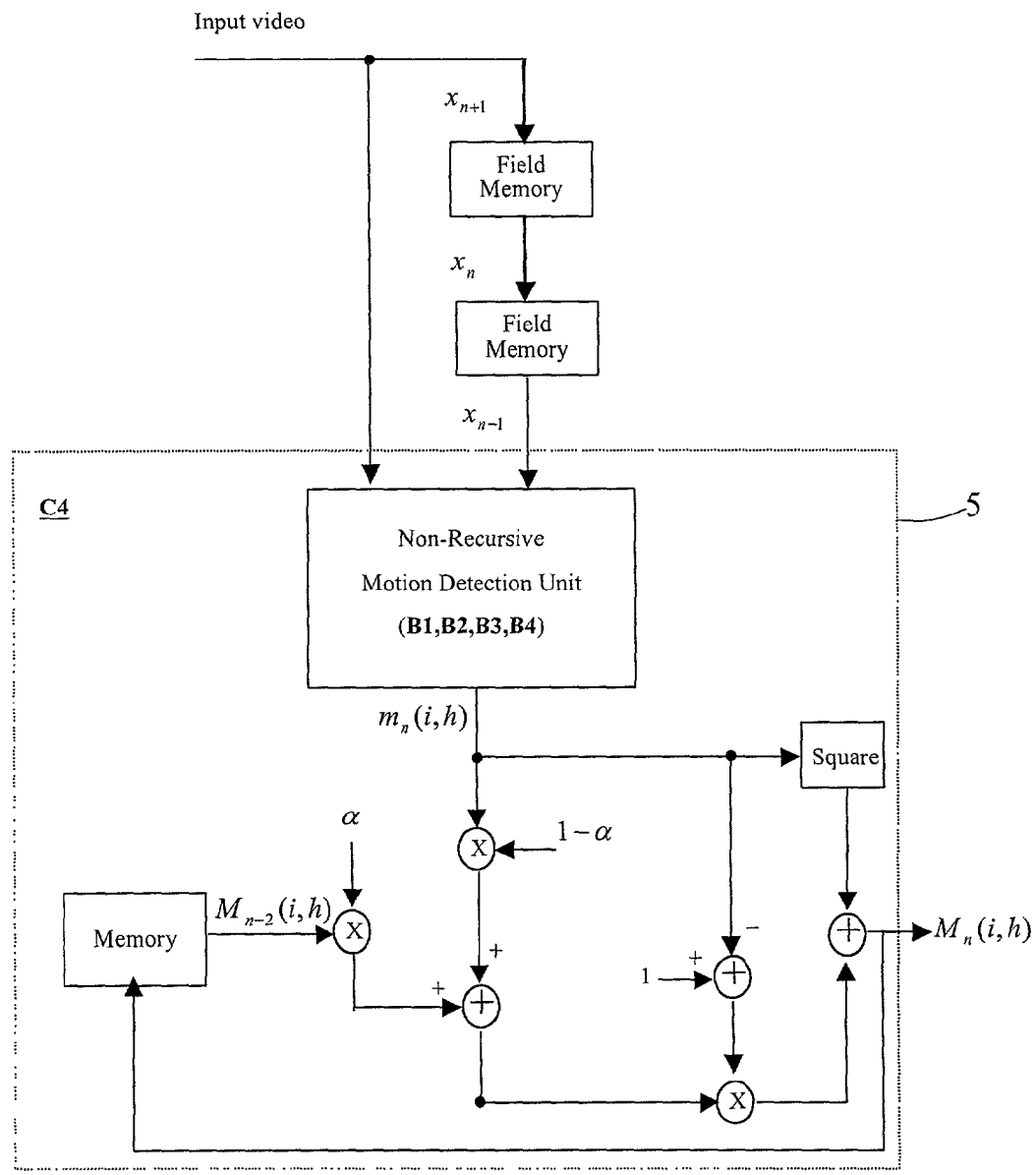

FIG. 13 discloses the embodiment of the recursive motion detection method based on the non-recursive motion decision parameter disclose in Eq. (6), where the non-recursive motion detection unit can be either the block B1, B2, B3, or B4 in FIG. 6, FIG. 7, FIG. 8, and FIG. 9, respectively.

In the following, the 3-D deinterlacing method of the present invention is disclosed based on the recursive motion detection method disclosed above.

Figure 14:
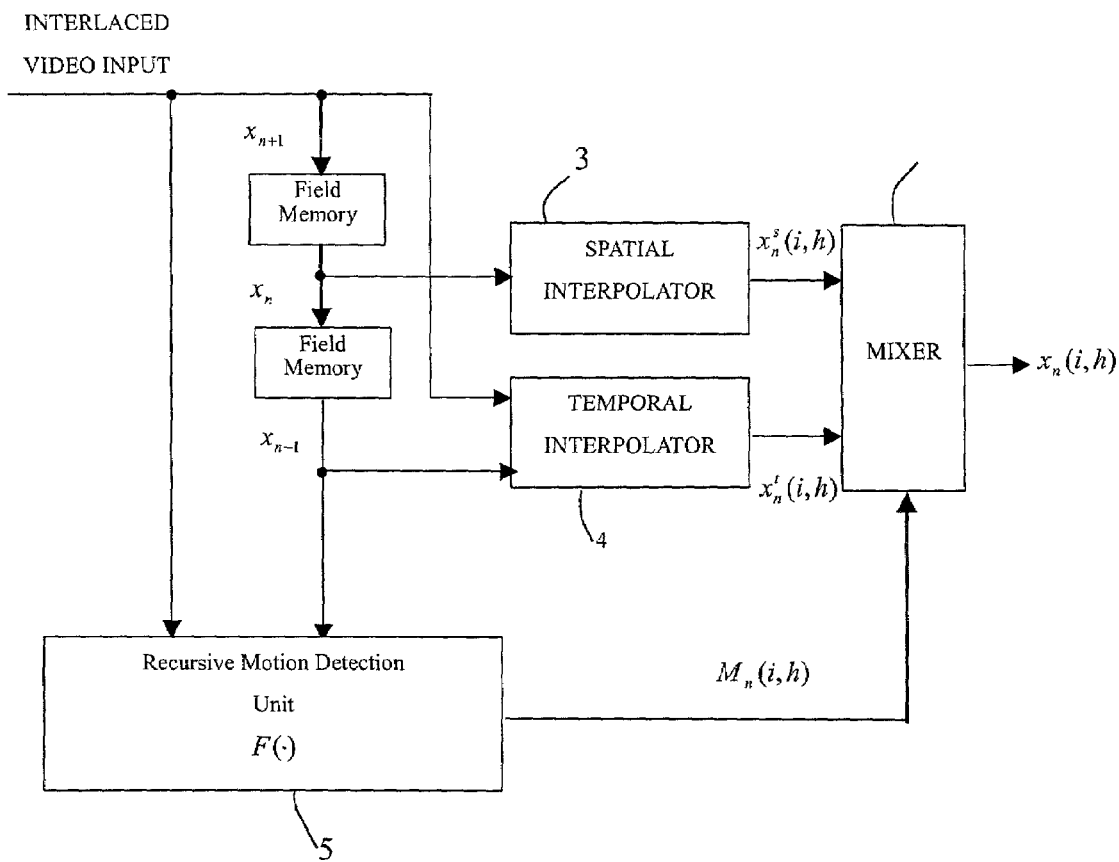
FIG. 14 is a block diagram of a device for converting an interlaced video input signal to a properly mixed deinterlaced video signal.

The computed recursive motion decision parameter $M_n(i,h)$ is then used to mix a spatially interpolated signal and a temporally interpolated signal. FIG. 14 discloses the embodiment of the present invention for interpolating the value of $x_n(i,h)$ given the interlaced video sequence based on the recursive motion decision parameter disclosed in Eq. (1), which comprises a spatial interpolator 3, a temporal interpolator 4, a motion decision processor 5, and a mixer 6. The spatial interpolator spatially interpolates the value of $x_n(i,h)$ by using a predetermined algorithm. The temporal interpolator temporally interpolates the value of $x_n(i,h)$ by using a predetermined algorithm. The recursive motion detection unit computes the recursive motion decision parameter, $M_n(i,h)$, which represents the degree of the motion at the interpolation location (i,h). The mixer mixes the output signal of the spatial interpolator and the output signal of the temporal interpolator in accordance with the recursive motion decision value. Letting $x_n^s(i,h)$ and $x_n^t(i,h)$ as the output signal of the spatial interpolator and the output signal of the temporal interpolator, the output signal of the mixer, or, the interpolated signal is represented as $x_n(i,h)=(1-M_n(i,h))\cdot x_n^t(i,h)+M_n(i,h)\cdot x_n^s(i,h).$ Note that $x_n(i,h)=x_n^t(i,h)$ when $M_n(i,h)=0$ (no motion) and $x_n(i,h)=x_n^s(v,h)$ when $M_n(i,h)=1$ (motion).

In FIG. 14, it does not matter what specific spatial interpolating algorithm and a temporal interpolating algorithm are used for the spatial interpolator and the temporal interpolator, respectively. Some examples of the spatially interpolated signal $x_n^s(v,h)$ are $x_n^s(i,h)=(x_n(i-1,h)+x_n(i+1,h))/2,$ which corresponds to a line average and $x_n^s(i,h)=x_n(i-1,h)$ which corresponds to a method known as line doubling. Also some examples of temporally interpolated signal $x_n^t(v,h)$ $$x_n^t(i,h)=(x_{n+1}(i,h)+x_{n-1}(i,h))/2$$

and $$x_n^t(i,h)=x_{n-1}(i,h).$$

Figure 15:
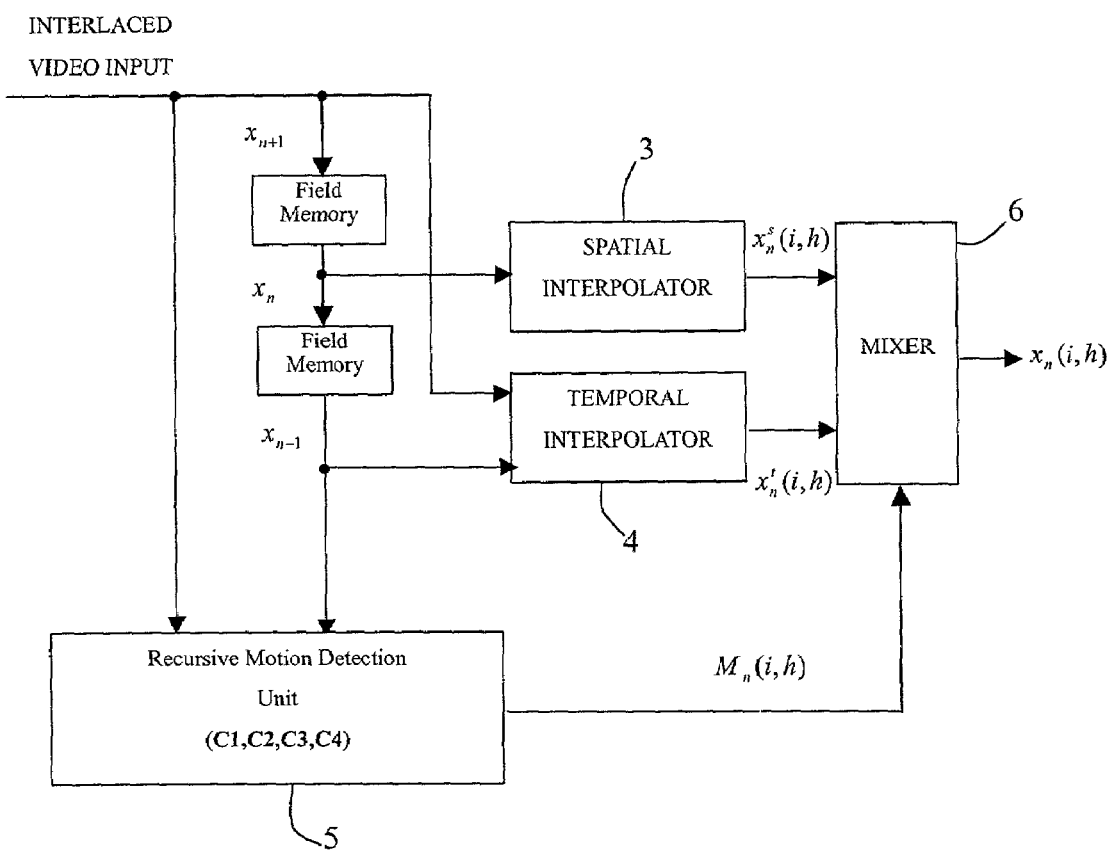
FIG. 15 is a block diagram of such a device incorporating any of the recursive motion detection units illustrated in FIGS. 10–13.

FIG. 15 discloses the embodiment of the present invention for interpolating the value of $x_n(i,h)$ given the interlaced video sequence based on the specific recursive motion decision parameter disclosed in Eq. (3) through Eq. (6), where the recursive motion detection unit can be either the block C1, C2, C3, or C4 in FIG. 10, FIG. 11, FIG., 12, and FIG. 13, respectively.

What is claimed is:

1. In a video signal processing system, a method of computing a motion decision value, which comprises the following steps:
   inputting a video signal with an interlaced video sequence of fields;
   comparing mutually corresponding fields and defining a point-wise non-recursive motion decision parameter indicating motion at a given point between a previous field and a next field in the video sequence;
   computing a recursive motion decision parameter by combining the non-recursive motion decision parameter with a motion decision parameter of at least one associated previous field; and
   outputting the recursive motion decision.

2. The method according to claim 1, wherein the step of forming the point-wise motion decision parameter comprises computing $$f_n(i,h)=l_k(d_n(i,h))$$

where $f_n(\bullet)$ is a point-wise motion detection signal, i and h define a spatial location of the respective video signal value in a cartesian matrix, and $l_k(\bullet)$ denotes a linearly scaling function.

3. The method according to claim 1, which comprises taking motion information of the associated previous fields into account in defining a current motion defined by the recursive motion decision parameter.

4. The method according to claim 3, wherein the recursive motion decision parameter $M_n(i,h)$ is in the form of $$M_n(i,h)=F(m_n(i,h),M_{n-2}(i,h))$$

where $F(\bullet)$ represents a monotonous function with respect to $M_n(i,h)$ and $M_{n-2}(i,h)$ having imposed thereon the following condition:

$$\min(m_n(i,h), M_{n-2}(i,h)) \leq F(m_n(i,h), M_{n-2}(i,h)) \leq \max(m_n(i,h), M_{n-2}(i,h)).$$

5. The method according to claim 3, wherein the recursive motion decision parameter $M_n(i,h)$ is a function of $m_n(i,h)$ and $M_{n-2}(i,h)$.

6. The method according to claim 1, which comprises computing a non-recursive motion detection signal from the point-wise motion detection parameter by an equation selected from the group consisting of $$\Phi_n(i,h)=f_n(i,h)+\min(f_{n-1}(i-1,h), f_{n-1}(i+1,h))$$

$$\Phi_n(i,h)=\mathrm{med}(f_n(i,h)(f_{n-1}(i-1,h), f_{n-1}(i+1,h))$$

$$\Phi_n(i,h)=\max(f_n(i,h), f_{n-1}(i-1h), f_{n-1}(i+1,h))$$

where $f_{n-1}(\bullet)$ denotes a motion detection signal delayed by one field, med($\bullet$) denotes a median operation, max($\bullet$) denotes an operation to minimize an error from a false motion detection, and the indices i and h define a spatial location of the respective video signal value in a cartesian matrix.

7. The method according to claim 1, which comprises taking motion information of the associated previous fields into account in defining a current motion defined by the recursive motion decision parameter, such that when motion is detected at a certain time, the motion information is propagated over the time domain.

8. The method according to claim 1, further comprising the steps of determining if motion is to be taken into account in a current frame by taking motion decision metrics of previous frames into account.

9. The method according to claim 8, further comprising the steps of computing the motion decision parameter recursively, by taking into account motion decision parameters of the associated previous fields.

10. The method of claim 1, wherein:
    the step of comparing mutually corresponding fields further includes the steps of:
       computing a frame difference signal from a difference between a previous field and a next field in the video sequence;
       forming a point-wise motion detection signal from the frame difference signal; and
    the step of defining a point-wise non-recursive motion decision parameter further includes the steps of forming from respectively associated fields of the video signal a point wise motion decision parameter as a function of the point-wise motion detection signal.

11. In a method of processing interlaced video signals, which comprises:
    spatially interpolating a value of the video signal at a given location from a video signal of at least one adjacent location in a given video field;
    temporally interpolating the value of the video signal at the given location from a video signal at the same location in temporally adjacent video fields; and
    forming a recursive motion decision value for the same location in accordance with claim 1; and
    mixing an output signal for the video signal at the given location from the spatially interpolated signal and the temporally interpolated signal and weighting the output signal in accordance with the recursive motion decision value.

12. The method according to claim 11, which comprises varying the motion decision value between 0 and 1 as a function of an estimate of the degree of motion at the given location and, upon estimating a high degree of motion, heavily weighting the output signal towards the spatially interpolated signal and, upon estimating a low degree of motion, heavily weighting the output signal towards the temporally interpolated signal.

13. The method according to claim 11, which comprises outputting the spatially interpolated signal as the output signal upon estimating a high degree of motion, and outputting the temporally interpolated signal as the output signal upon estimating a low degree of motion.

14. In a video signal processing system, an apparatus for computing a motion decision value, comprising:
    an input for receiving a video signal with an interlaced video sequence of successive fields;
    a non-recursive motion detection unit connected to receive the video signal and to compute and output a non recursive motion decision parameter defining a motion difference between a previous field and a next field of a current field to be deinterlaced;

a recursive motion detection unit connected to receive the non-recursive motion decision parameter and configured to compute a recursive motion decision parameter by combining the non-recursive motion decision parameter with a motion decision parameter of at least one associated previous field.

15. The apparatus according to claim 14, wherein said recursive motion detection unit is configured to take into account motion information of the associated previous fields in defining a current motion defined by the recursive motion decision parameter.

16. The apparatus according to claim 15, wherein the recursive motion decision parameter $M_n(i,h)$ is in the form of $$M_n(i,h)=F(m_n(i,h), M_{n-2}(i,h))$$

where $F(\bullet)$ represents a monotonous function with respect to $M_n(i,h)$ and $M_{n-2}(i,h)$ having imposed thereon the following condition:

$$\min(m_n(i,h), M_{n-2}(i,h)) \leq F(m_n(i,h), M_{n-2}(i,h)) \leq \max(m_n(i,h), M_{n-2}(i,h)).$$

17. The apparatus according to claim 14, wherein said non-recursive motion detection unit is programmed to form from respectively associated fields of the video signal a point-wise motion decision parameter in accordance with $$f_n(i,h)=l_K(d_n(i,h))$$

where $f_n(\bullet)$ is a point-wise motion detection signal, i and h define a spatial location of the respective video signal value in a cartesian matrix, and $l_K(\bullet)$ denotes a linearly scaling function.

18. The apparatus according to claim 17, wherein said non-recursive motion detection unit is programmed to compute a non-recursive motion detection signal from the point-wise motion decision parameter by an equation selected from the group consisting of $$\Phi_n(i,h)=f_n(i,h)+\min(f_{n-1}(i-1,h),f_{n-1}(i+1,h))$$

$$\Phi_n(i,h)=\text{med}(f_n(i,h),f_{n-1}(i-1,h),f_{n-1}(i+1,h))$$

$$\Phi_n(i,h)=\max(f_n(i,h),f_{n-1}(i-1,h),f_{n-1}(i+1,h))$$

where $f_{n-1}(\bullet)$ denotes a motion detection signal delayed by one field, med($\bullet$) denotes a median operation, max($\bullet$) denotes an operation to minimize an error from a false motion detection, and the indices i and h define a spatial location of the respective video signal value in a cartesian matrix.

19. The apparatus according to claim 14, which further comprises a low-pass filter connected to an output of said recursive motion detection unit.

20. The apparatus according to claim 19, wherein said low-pass filter is configured to filter a signal carrying the recursive motion decision parameter to form the motion decision value $m_n(i,h)$ by:

$$m_n(i, h) = \sum_{p=-a}^{b} \sum_{q=-c}^{d} \phi_n(i+2\times p, h+2\times q) \cdot \alpha_{p,q}$$

where $a,b,c,d \geq 0$, and $\alpha_{p,q}$ represents a set of normalized predetermined coefficients of said low pass filter.

21. An apparatus for processing interlaced video signals, which comprises:

an input for receiving a video signal with an interlaced video sequence of fields;

a spatial interpolator connected to said input and configured to spatially interpolate a value of the video signal at a given location from a video signal of at least one adjacent location in a given video field;

a temporal interpolator connected to said input in parallel with said spatial interpolator for temporally interpolating the value of the video signal at the given location from a video signal at the same location in temporally adjacent video fields; and an apparatus according to claim 14 connected to said input and in parallel with said spatial interpolator and said temporal interpolator for forming a motion decision value for the same location; and a mixer connected to receive an output signal from each of said spatial interpolator, said temporal interpolator, and said computing apparatus, said mixer being configured to mix an output signal for the video signal at the given location from the spatially interpolated signal and the temporally interpolated signal in dependence on the recursive motion decision value output by said apparatus according to claim 14.

* * * * *